(12) United States Patent
Shi et al.

(10) Patent No.: US 12,379,585 B1
(45) Date of Patent: Aug. 5, 2025

(54) EYEPIECE AND OPTICAL SYSTEM

(71) Applicant: GOERTEK OPTICAL TECHNOLOGY CO., LTD., Shandong (CN)

(72) Inventors: Chaiyuan Shi, Weifang (CN); Long Jiang, Weifang (CN)

(73) Assignee: GOERTEK OPTICAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 19/070,995

(22) Filed: Mar. 5, 2025

(30) Foreign Application Priority Data

Apr. 22, 2024 (CN) .......................... 202410479855.0

(51) Int. Cl.
  *G02B 25/00* (2006.01)
  *G02B 17/08* (2006.01)
(52) U.S. Cl.
  CPC ....... *G02B 25/001* (2013.01); *G02B 17/0856* (2013.01)
(58) Field of Classification Search
  CPC .................. G02B 25/001; G02B 17/0856
  USPC ........................ 359/642, 643, 644
  See application file for complete search history.

(56) References Cited

U.S. PATENT DOCUMENTS 11,054,622 B1   7/2021   Gollier et al.
11,360,308 B2 *  6/2022  Maimone ................. G02B 5/32

FOREIGN PATENT DOCUMENTS

| CN | 110603478 A | 12/2019 |
| CN | 116149065 A | 5/2023 |
| CN | 117872606 A | 4/2024 |
| TW | 202234121 A | 9/2022 |

OTHER PUBLICATIONS

First Office Action in Corresponding Chinese Application No. 202410479855.0, dated May 29, 2024; 12 pgs.
Notice of Grant in Corresponding Chinese Application No. 202410479855.0, dated Jun. 20, 2024; 5 pgs.

* cited by examiner

*Primary Examiner* — Tuyen Tra
(74) *Attorney, Agent, or Firm* — HAUPTMAN HAM, LLP

(57) ABSTRACT

Disclosed are an eyepiece and an optical system. The eyepiece includes a beam splitting element, a phase retarder, a polarized reflective element, and a lens group provided along a same optical axis. The lens group is provided between the optical path formed by the beam splitting element, the phase retarder, and the polarized reflective element, with the phase retarder provided between the beam splitting element and the polarized reflective element. The eyepiece has an optical power $\varphi$, a back focal length B, and a total track length L, satisfying the condition: $0.001 \leq \varphi/(L-B) \leq 0.003$.

19 Claims, 11 Drawing Sheets

| field of view | 1 | 2 | 3 | 4 | 5 | 6 |
|---|---|---|---|---|---|---|
| RMS radius | 0.958 | 1.626 | 2.707 | 4.056 | 6.796 | 13.702 |
| geometric radius | 1.871 | 4.355 | 6.295 | 9.902 | 21.099 | 40.919 |

EYEPIECE AND OPTICAL SYSTEM

CROSS-REFERENCE TO RELATED APPLICATIONS

This application claims priority to Chinese Patent Application No. 202410479855.0, filed on Apr. 22, 2024. The disclosures of the above-mentioned applications are incorporated herein by reference in their entireties.

TECHNICAL FIELD

Embodiments of the present application relate to the technical field of optical, and in particular to an eyepiece and an optical system.

BACKGROUND

As a key visual imaging component, the optical performance and spatial layout of the eyepiece are crucial to the user experience. However, as the size of the display decreases, the size of the entire eyepiece optical solution also needs to be reduced accordingly. Conventionally, the smaller the spatial size in the eyepiece (the spatial size here refers to the gap between lenses, the gap between the lens assembly and the screen, etc.), the more beneficial it is to the imaging quality of the eyepiece, but in actual assembly, in order to meet assembly requirements, a certain spatial size needs to be guaranteed. How to achieve high-quality imaging in a limited space while meeting assembly requirements has become a problem that needs to be solved urgently.

SUMMARY

The main objective of the present application is to provide a new technical solution for eyepieces and optical systems.

In a first aspect, an embodiment of the present application provides an eyepiece, including a beam splitting element, a phase retarder, a polarized reflective element, and a lens group provided along a same optical axis, the lens group is provided between an optical path formed by the beam splitting element, the phase retarder, and the polarized reflective element, the phase retarder is provided between the beam splitting element and the polarized reflective element; and an optical power of the eyepiece is $\varphi$, a back focal length of the eyepiece is B, a total track length of the eyepiece is L, and $0.001 \leq \varphi/(L-B) \leq 0.003$.

In an embodiment, the eyepiece further includes a display screen, the display screen is provided at a side of the beam splitting element distant from the phase retarder; and the lens group includes at least one lens, and a notch is at least partially provided at a non-optically effective area of a lens adjacent to the display screen.

In an embodiment, a length v of the notch along a first direction is greater than 0.

In an embodiment, a length h of the notch along a second direction is greater than or equal to 0.1 mm.

In an embodiment, the first direction is parallel to the optical axis, and the second direction is perpendicular to the first direction.

In an embodiment, the back focal length B of the eyepiece and the length v of the notch along the first direction satisfy: B−v>0.05 mm;

In an embodiment, a radial dimension of a non-optically effective area of a lens adjacent to the display screen is A, and the A and the length h of the notch along the second direction satisfy: $0.025 \leq h/A \leq 1$.

In an embodiment, the optical power $\varphi$ of the eyepiece satisfies: $0.02 < \varphi < 0.08$.

In an embodiment, the total track length L of the eyepiece satisfies: 10 mm<L<27 mm.

In an embodiment, the back focal length B of the eyepiece satisfies: 1 mm<B<4 mm.

In an embodiment, the lens group includes a first lens, a second lens, a third lens, and a fourth lens provided along the optical axis; the fourth lens is provided at a side adjacent to the display screen, the first lens is provided at a side distant from the display screen, and the second lens and the third lens are sequentially provided between the first lens and the fourth lens.

In an embodiment, the notch is provided in a non-optically effective area on a surface of the fourth lens adjacent to the display screen, and the notch is provided in a surrounding manner or in a local area.

In an embodiment, the eyepiece further includes a polarizing element provided at a side of the polarized reflective element distant from the phase retarder.

In an embodiment, the eyepiece further includes a composite film material provided between the display screen and the beam splitting element and configured to convert light emitted by the display screen into circularly polarized light.

In an embodiment, the composite film material includes at least a polarizing film and a phase retardation film.

In an embodiment, the polarization element, the polarization reflection element and the phase retarder are stacked in sequence to form a laminated element.

In an embodiment, the laminated element is provided at a surface of the first lens adjacent to the display screen.

In an embodiment, the beam splitting element is provided in an optically effective area on a surface of the fourth lens adjacent to the display screen.

In an embodiment, the composite film material is provided at a light-emitting surface of the display screen.

In an embodiment, the laminated element is provided at a surface of the first lens distant from the display screen.

In an embodiment, the beam splitting element is provided in an optically effective area on a surface of the fourth lens adjacent to the display screen.

In an embodiment, the composite film material is provided at a light-emitting surface of the display screen.

In an embodiment, the laminated element is provided at a side of the first lens adjacent to the display screen.

In an embodiment, the beam splitting element is provided at a surface of the fourth lens distant from the display screen.

In an embodiment, the composite film material is provided in an optically effective area on a surface of the fourth lens adjacent to the display screen.

In a second aspect, an embodiment of the present application provides an optical system, which includes the eyepiece as described in the first aspect.

One beneficial effect of the present application is:
according to the eyepiece provided in the embodiment of the present application, high-quality imaging is achieved in a limited space through the design of the relationship between the specific optical focal length, back focal length and total track length, which improves the compactness of the layout of the entire eyepiece and ensures the assembly requirements. In other words, the eyepiece provided in the embodiment of the present application achieves high-quality imaging in a limited space and meets the assembly requirements.

Other features and advantages of the present specification will become apparent from the following detailed description of exemplary embodiments of the present specification with reference to the accompanying drawings.

BRIEF DESCRIPTION OF THE DRAWINGS

The drawings, which are incorporated in and constitute a part of the description, illustrate embodiments of the present description and, together with the description, serve to explain the principles of the present description.

DETAILED DESCRIPTION OF THE EMBODIMENTS

Figure 1:
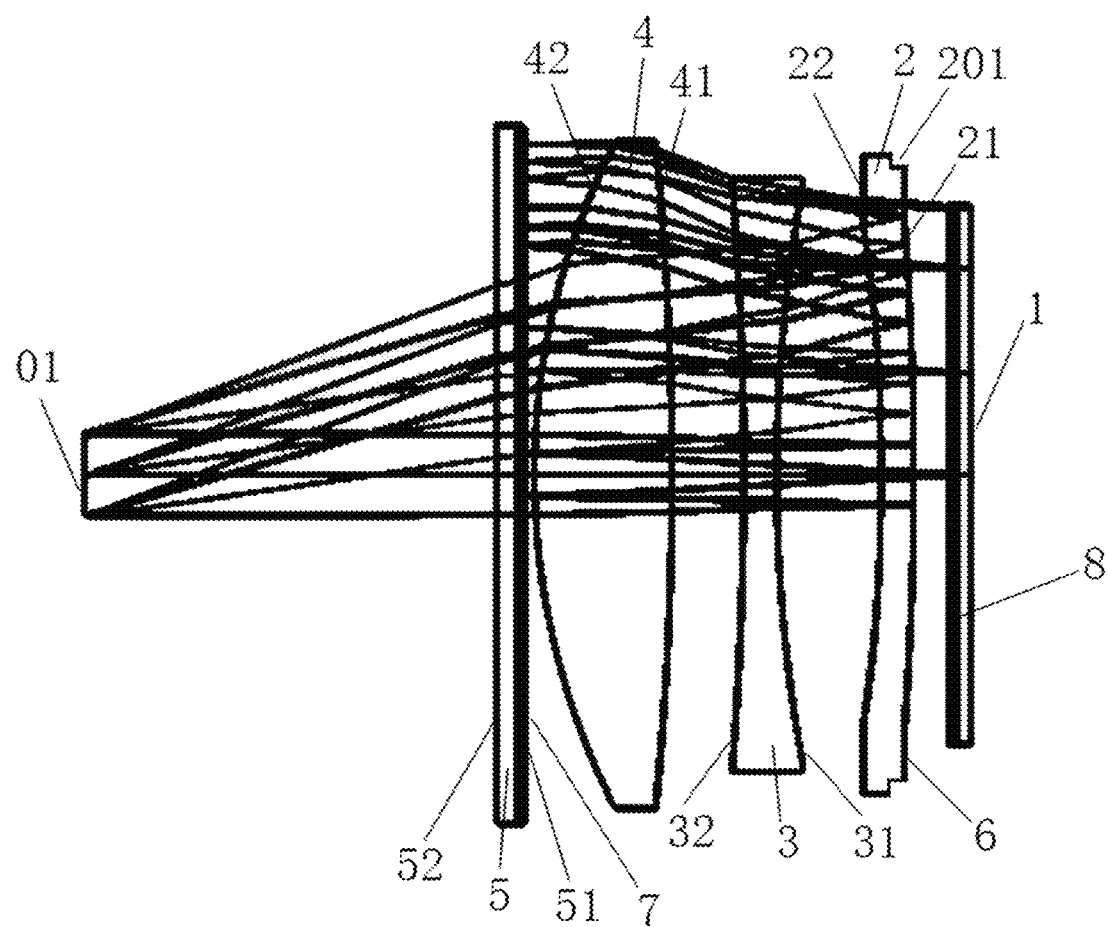
FIG. 1 is a schematic diagram of an optical structure and optical path of an eyepiece according to an embodiment of the present application.

The various exemplary embodiments of the present application will now be described in detail with reference to the accompanying drawings. It should be noted that, unless otherwise specifically stated, the relative arrangement of components and steps, numerical expressions, and values described in these embodiments do not limit the scope of the present application.

The following description of at least one exemplary embodiment is merely illustrative and should not be construed as any limitation on the present application, its applications, or its uses.

Techniques and devices known to those skilled in the art may not be discussed in detail; however, where appropriate, such techniques and devices should be regarded as part of the description.

In all examples shown and discussed herein, any specific values should be interpreted as merely illustrative rather than limiting. Accordingly, other examples of exemplary embodiments may have different values.

It should be noted that similar reference numerals and letters in the following drawings indicate similar elements. Therefore, once an element has been defined in one figure, it does not require further discussion in subsequent figures.

The embodiments of the eyepiece and optical system provided in the present application will be described in detail below with reference to the accompanying drawings.

Figure 2:
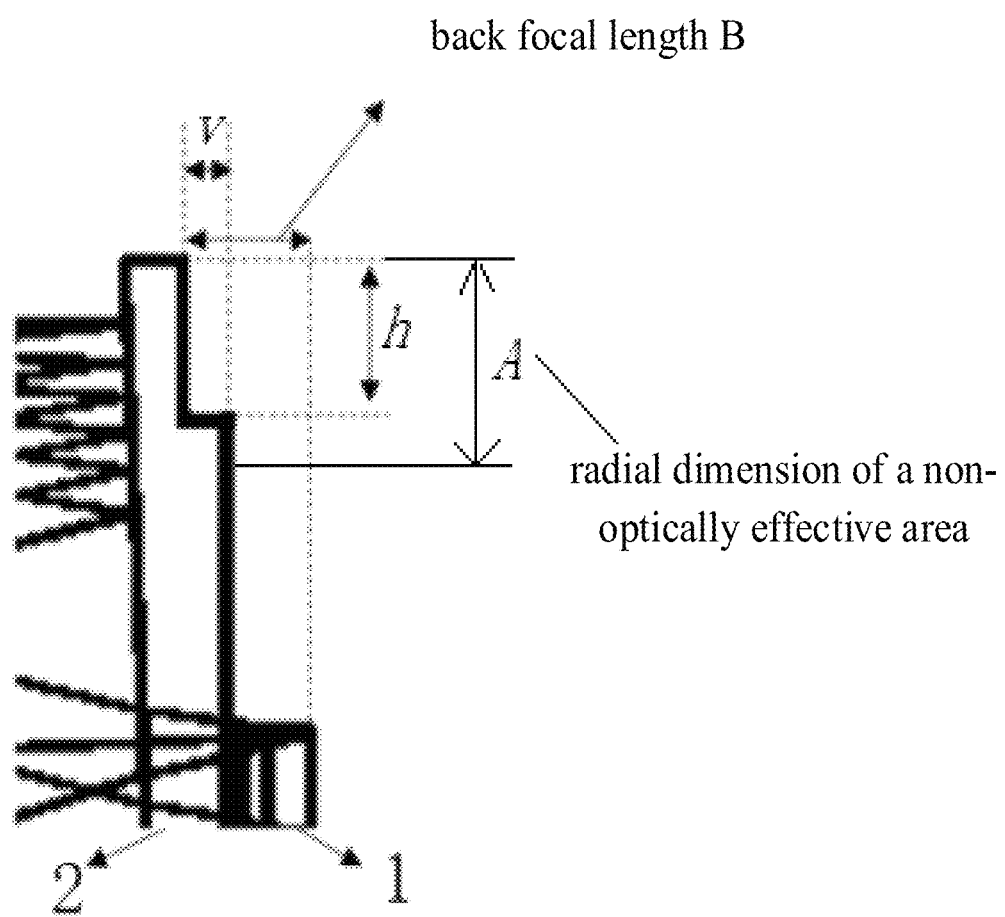
FIG. 2 is a partial enlarged view of a lens adjacent to human eyes in FIG. 1.
Figure 3:
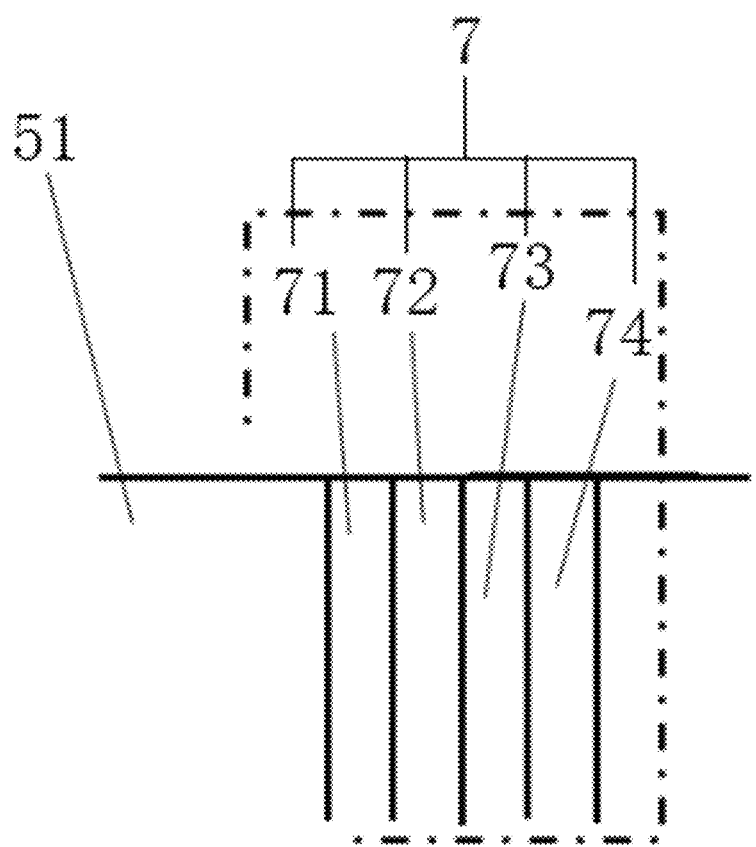
FIG. 3 is a schematic diagram of a film-attaching manner for a laminated element of the eyepiece shown in FIG. 1.

An embodiment of the present application provides an eyepiece, as shown in FIG. 1 to FIG. 3, the eyepiece includes a beam splitting element 6, a phase retarder 74, a polarized reflective element 73 and a lens group provided along the same optical axis. The lens group is provided between the optical path formed by the beam splitting element 6, the phase retarder 74 and the polarized reflective element 73, and the phase retarder 74 is provided between the beam splitting element 6 and the polarized reflective element 73. The optical power of the eyepiece is φ, the back focal length of the eyepiece is B, the total track length of the eyepiece is L, the eyepiece satisfies the following ratio relationship: $0.001 \leq \varphi/(L-B) \leq 0.003$, and the unit of the ratio is: $1/mm^2$.

An embodiment of the present application provides an optical structure design of an eyepiece, the eyepiece is sequentially provided with a beam splitting element 6, a phase retarder 74 and a polarized reflective element 73 along the same optical axis, and a lens group is introduced between the above-mentioned optical elements. These optical elements and lens groups each have different functions, and they work together to achieve precise control of light. This optical layout enables light to propagate in a folded optical path along a predetermined path, and after modulation and processing by these optical elements and lens groups, a better visual effect is finally presented. The introduction of the folded optical path can reduce the size of the entire eyepiece along the optical axis while ensuring the imaging quality.

In the eyepiece provided in the embodiment of the present application, as shown in FIG. 1 and FIG. 3, the polarized reflective element 73 is provided at the side adjacent to the human eye 01, the beam splitting element 6 is provided at the side distant from the human eye 01, and the phase delay device 74 is provided between the polarized reflective element 73 and the beam splitting element 6.

The beam splitting element 6 is, for example, a semi-transparent and semi-reflective film, which has special optical properties and can split the incident light into two parts, one for reflection and the other for transmission. This property enables the eyepiece to simultaneously process light from different directions or sources, thereby improving the utilization rate of light and the clarity of imaging.

It should be noted that the reflectivity and transmittance of the beam splitting element 6 can be flexibly adjusted according to specific needs, and this is not limited in the embodiments of the present application.

The phase retarder 74 can be used to change the polarization state of the light. For example, it is used to convert linear polarized light into circular polarized light, or to convert circular polarized light into linear polarized light. In the eyepiece provided in the embodiment of the present application, the phase retarder 74 is, for example, a ¼ waveplate. This ¼ waveplate can cause a relative phase delay between the polarization components of the two vibration directions of the polarized light that are perpendicular to each other, thereby changing the polarization characteristics of the light. In the embodiment of the present application, the ¼ waveplate can accurately control the polarization state of the light and further optimize the imaging effect.

The phase retarder 74 can be configured as other phase retarder films as required.

In an embodiment, the polarized reflective element 73 is a polarized reflector that reflects horizontal linear polarized light and transmits vertical linear polarized light, or a polarized reflector that reflects linear polarized light at any other specific angle and transmits linear polarized light perpendicular to the angle. In the eyepiece provided in the embodiment of the present application, the polarized reflective element 73 is a polarized reflective film.

The lens group is provided between the folded optical paths formed by the above optical elements and can be used to focus and image the light. By accurately designing the optical parameters and optical structure of the lens group, it is possible to achieve precise control of the light and ensure the clarity and quality of the imaging.

In the eyepiece provided in the embodiment of the present application, the relationship between the focal power $\varphi$, back focal length B and total track length L of the eyepiece is specially designed. By controlling the three parameters to meet the following specific conditions: $0.001 \leq \varphi/(L-B) \leq 0.003$ (unit: $1/mm^2$), the best imaging effect of the eyepiece in a limited space can be achieved without affecting the assembly of the eyepiece. This design can not only reduce the volume of the eyepiece, but also ensure excellent imaging quality.

The back focal length B of the eyepiece is a key factor affecting the image quality. In theory, the shorter the back focal length B, the better the image quality. However, in the actual assembly process, it is necessary to consider the structural parts on the display screen 1 of the eyepiece, and these structural parts need enough space to be properly placed. Therefore, the value of the back focal length B cannot be designed to be too compact, so as not to fail to meet the assembly requirements.

There is a close relationship between the back focal length B and the total track length L. When the back focal length B increases, the total track length L will also increase accordingly; conversely, a decrease in the back focal length B will result in a shortening of the total track length L. By limiting the value of (L−B), the thickness of the lens adjacent to the screen and the air gap between the lens and the display screen can be effectively controlled. In the embodiment of the present application, the thickness of the lens adjacent to the screen is actually increased so that the light can propagate inside the lens. Compared to the original scenario where light had to pass through an air gap, this solution is more beneficial for improving imaging quality.

The focal power $\varphi$ of the eyepiece is introduced as a constraint. There is also a correlation between the focal power $\varphi$ and the total track length L, that is, the smaller the total track length L, the larger the focal power $\varphi$. This means that while controlling the total track length L, the back focal length B of the eyepiece can also be reasonably adjusted to achieve the best imaging effect.

In general, by comprehensively considering the relationship between the back focal length B, the total track length L, and the optical focal length $\varphi$, the optical performance of the eyepiece can be optimized and the imaging quality can be improved while meeting the assembly requirements.

According to the eyepiece provided in the embodiment of the present application, the beam splitting element 6, the phase retarder 74, the polarized reflective element 73 and the lens group are used in combination to form a folded optical path, so that the incident light can be fully utilized to improve the brightness and clarity of the image. The phase retarder 74 is, for example, a ¼ waveplate that can accurately adjust the polarization state of the light, eliminate or reduce the influence of polarization on the image quality, and make the image clearer and more realistic. In addition, by optimizing the relationship between the overall optical power $\varphi$, the back focal length B and the total track length L of the eyepiece, the best imaging effect of the eyepiece in a limited space is achieved, and the volume of the eyepiece is reduced without affecting the assembly.

The eyepiece provided in the embodiment of the present application is not only suitable for electronic products such as head-mounted display devices, but can also be widely used in high-precision visual devices such as sights In some examples of the present application, as shown in FIG. 1 to FIG. 3, the eyepiece further includes a display screen 1, and the display screen 1 is provided at the side of the beam splitting element 6 distant from the phase retarder 74. The lens group includes at least one lens, a notch 201 is at least partially provided on a non-optically effective area of a lens adjacent to the display screen 1.

According to this example, as shown in FIG. 1, the optical structure design of the eyepiece is further described, and a display screen 1 is introduced. The display screen 1 is provided at the side of the beam splitting element 6 distant from the phase retarder 74, and the light (i.e., incident light) emitted by the display screen 1 first passes through the beam splitting element 6 and then passes through at least one lens to reach the phase retarder 74 and the polarized reflective element 73, and then is folded back between the polarized reflective element 73 and the beam splitting element 6 to finally form an image.

It is worth mentioning that, as shown in FIG. 1 and FIG. 2, a notch 201 is at least partially provided on the non-optically effective area of a lens adjacent to the display screen 1. The design of the notch 201 is not random, but is carefully considered. In practical applications, the display screen 1 often needs to be equipped with some assembly parts or support parts to ensure its stability and functionality, and these parts may extend into the area of the lens group. If no special treatment is done, these parts may cause structural interference with the lens group, which not only affects the back focal length B of the eyepiece, and then affects the total track length L, but also may affect the propagation of light and the imaging quality.

Therefore, by providing a notch 201 on the non-optically effective area of a lens adjacent to the display screen 1, it is possible to effectively avoid the assembly parts or support parts on the display screen 1, ensuring that they will not cause structural interference with the lens group. This not only avoids potential mechanical conflicts, but also ensures smooth propagation of light, thereby ensuring imaging quality. It should be noted that the notch 201 is located in the non-optically effective area of the lens, so it does not affect the optical performance of the eyepiece.

In general, in the embodiment of the present application, the design of the notch 201 has the following advantages.

Firstly, avoiding interference: the assembly parts or supporting parts on the display screen 1 can be avoided.

Secondly, optimizing spatial layout: an efficient optical design is achieved within a limited space, so that the back focal length B and the total track length L of the entire eyepiece are reasonably controlled, and the overall optical structure is more compact.

Lastly, improving imaging quality: it avoids light distortion or obstruction caused by mechanical interference, thereby ensuring the clarity and accuracy of the image.

In addition, this design has certain expansibility. For example, with the continuous advancement of display technology, the display screen 1 may become thinner and lighter, and the structure of the assembly parts and the support parts may also change. By providing the notch 201, these changes can be easily adapted, so that the eyepiece can be compatible with display screens of different specifications and types.

In some examples of the present application, as shown in FIG. 2, the length v of the notch 201 along the first direction is greater than 0; and/or the length h of the notch 201 along the second direction is greater than or equal to 0.1 mm; the first direction is parallel to the optical axis, and the second direction is perpendicular to the first direction.

The design of the notch 201 is not completely random, and its shape and size are carefully calculated and designed to meet specific functional requirements. Not only can a whole circle of notches 201 be provided around the non-optically effective area of the lens adjacent to the screen side to accommodate a wide range of assembly scenarios, but also notches 201 can be flexibly provided in local areas according to actual needs to achieve more refined assembly adjustments.

Specifically, as shown in FIG. 2, the length v of the notch 201 along the first direction is greater than 0, and the first direction here is parallel to the optical axis direction, and the specific value of v needs to be determined according to the actual assembly requirements to ensure that the assembly parts or support parts on the display screen 1 can be avoided. The length h of the notch 201 along the second direction is greater than or equal to 0.1 mm, and the second direction here is perpendicular to the first direction, which means that the notch 201 has a certain size in the direction perpendicular to the optical axis. Such a design can ensure that the notch 201 can accommodate assembly parts or support parts of different sizes and shapes, and enhance the flexibility and versatility of the design. At the same time, the minimum value of h is set to 0.1 mm based on practical application considerations, which not only ensures the functionality of the notch 201, but also avoids unnecessary damage to the structure of the lens due to the excessive size of the notch 201.

According to the size range of the notch 201 provided in the example of the present application, the shape and size of the notch 201 can be adjusted according to actual needs to adapt to display screen assemblies or support parts of different specifications and types. By setting a reasonable size of the notch 201, it can be ensured that the display screen 1 and its assembly parts or support parts can be smoothly installed in the eyepiece, thereby improving the convenience and efficiency of assembly. In addition, since the notch 201 is located in the non-optically effective area of the lens, under the premise of avoiding mechanical interference, the optical performance of the lens is less affected, thereby ensuring the clarity and accuracy of imaging.

By providing notch 201 with specific size characteristics, the optical performance of the eyepiece can be optimized and the imaging quality can be improved while meeting the assembly requirements. This design is not only flexible and convenient, but also has good scalability and can adapt to the development and changes of future technologies.

In some examples of the present application, as shown in FIG. 2, the rear focal length B of the eyepiece and the length v of the notch 201 along the first direction satisfy: $B-v>0.05$ mm. The radial dimension of the non-optically effective area of a lens adjacent to the display screen 1 is A, and the radial dimension of the non-optically effective area of the lens and the length h of the notch 201 along the second direction satisfy: $0.025 \leq h/A \leq 1$.

According to this example, the optical structure design of the eyepiece further describes the relationship between the back focal length B and the length v of the notch 201 along the first direction, and the proportional relationship between the radial size A of the non-optically effective area of the lens adjacent to the display screen 1 and the length h of the notch 201 along the second direction.

Regarding the relationship between the back focal length B of the eyepiece and the length v of the notch 201 along the first direction, the condition $B-v>0.05$ mm is satisfied, which ensures that the size of the back focal length B is appropriate and can meet the assembly size requirements. Even if the notch 201 is provided, it will not have a significant impact on the overall focal length of the eyepiece. This design takes into account the balance between assembly requirements and optical performance. If the back focal length B is too small and the length v of the notch 201 along the first direction is too large, the focal length of the eyepiece may change significantly, thereby affecting the imaging quality. Therefore, by limiting the minimum value of $B-v$, the optical performance of the eyepiece can be maintained while ensuring the assembly space.

The ratio between the radial dimension A of the non-optically effective area of the lens in which the notch 201 is provided and the length h of the notch 201 along the second direction satisfies the condition $0.025 \leq h/A \leq 1$, which defines the relative size of the notch 201 in the second direction. The design of this ratio takes into account the compactness of the structure and the convenience of assembly of the eyepiece. If h/A is too small, that is, the length h of the notch 201 along the second direction is too small relative to the radial dimension A of the non-optically effective area of the lens, it may not meet the requirements of assembling large structural parts on the display screen 1. On the contrary, if h/A is too large, that is, the length h of the notch 201 along the second direction may affect the structural stability and optical performance of the lens. Therefore, by limiting the ratio range of h/A, the structural design and optical performance of the eyepiece can be optimized while ensuring the assembly requirements.

According to the above example, the size and shape of the notch 201 on the non-optically effective area of the lens adjacent to the screen are limited. By limiting the relationship between the back focal length B and the length v of the notch 201 along the first direction, and the proportional relationship between the radial dimension A of the non-optically effective area and the length h of the notch 201 along the second direction, the notch 201 can be set to meet the assembly requirements while maintaining the optical performance of the eyepiece to the maximum extent, ensuring that the imaging quality is not affected. Reasonable notch design makes it easier to install the display screen 1 and its structural parts into the eyepiece, improving the convenience and efficiency of assembly. By further optimizing the size and position of the notch, the compactness and stability of the eyepiece structure can be maintained while ensuring the assembly space, thereby improving the overall performance of the product.

In addition, the size and position of the notch 201 can be adjusted to adapt to new application scenarios and requirements. For example, for a larger display screen or a more complex structure, the size of the notch can be appropriately increased to meet assembly requirements. Conversely, for a more compact eyepiece design or higher optical performance requirements, the size of the notch can be reduced to reduce the impact on the optical performance.

Figure 8:
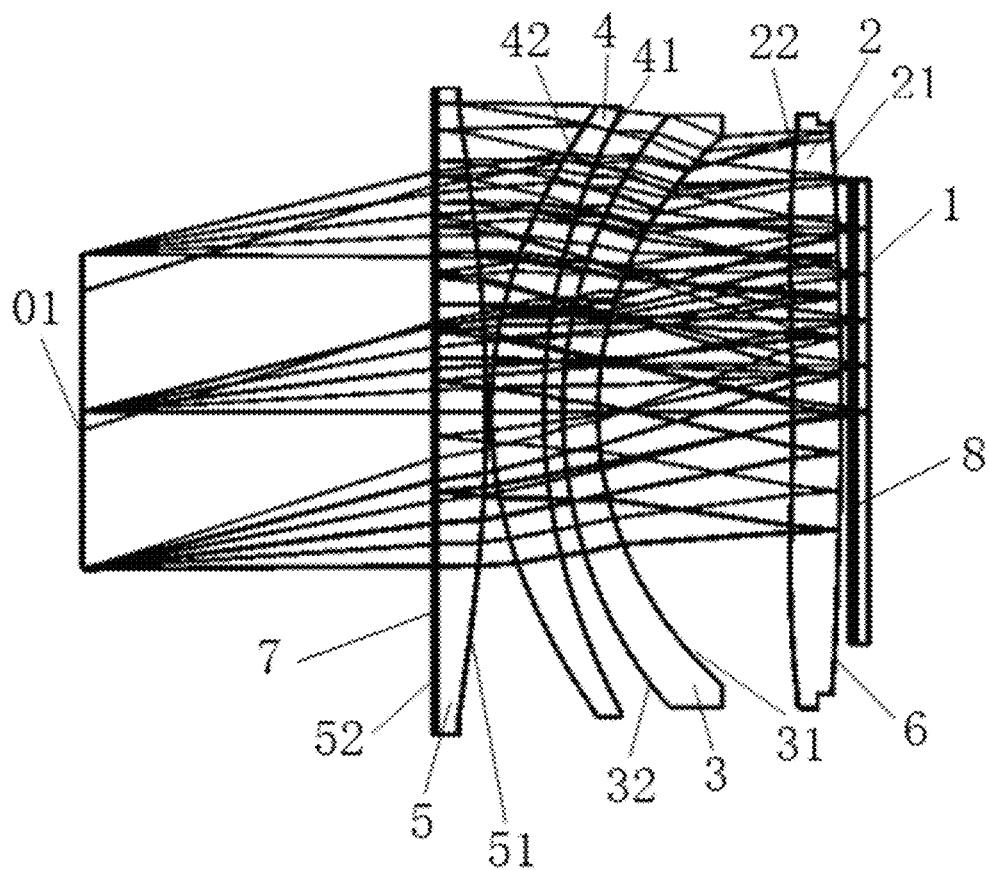
FIG. 8 is a schematic diagram of another optical structure and optical path of the eyepiece according to an embodiment of the present application.
Figure 14:
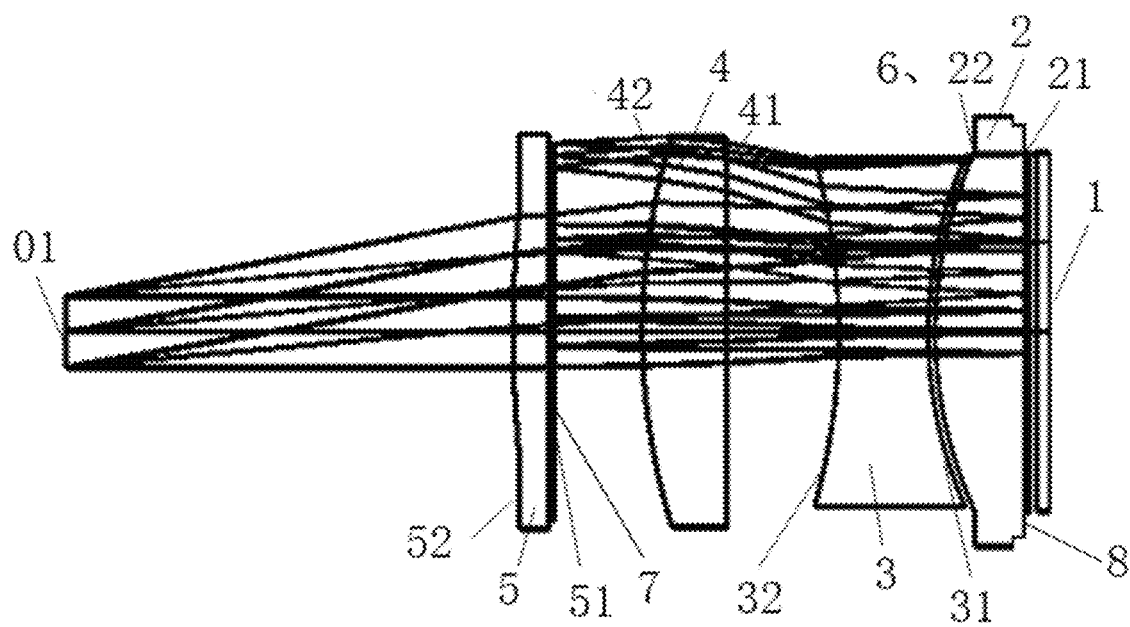
FIG. 14 is a schematic diagram of another optical structure and optical path of the eyepiece according to an embodiment of the present application.

In some examples of the present application, as shown in FIG. 1, FIG. 8 and FIG. 14, the optical focal length φ of the eyepiece ranges from 0.02 to 0.08, the total track length L of the eyepiece ranges from 10 mm to 27 mm, and the back focal length B of the eyepiece ranges from 1 mm to 4 mm.

According to this example, three key parameters of the eyepiece are described: the specific range of the optical power φ, the total track length L, and the back focal length B. The setting of these parameters is based on comprehensive considerations during the eyepiece design process, aiming to achieve specific technical effects.

The focal power φ of the eyepiece is in the range of 0.02<φ<0.08. The focal power is a physical quantity indicating the ability of the eyepiece to converge or diverge light, and its value determines the focal length of the eyepiece. Selecting the focal power within this range can ensure that the eyepiece has an appropriate focal length to meet specific visual needs.

The total track length L of the eyepiece ranges from 10 mm to 27 mm. The total track length refers to the distance from the object focus to the image focus of the eyepiece, which determines the overall size of the eyepiece. Selecting the total track length within this range can ensure that the eyepiece is not too large. At the same time, a reasonable total track length also helps to optimize the optical performance of the eyepiece and improve the imaging quality.

The back focal length B of the eyepiece is limited to the range of 1 mm to 4 mm. The back focal length refers to the distance from the last side of the lens group to the image focus, which has an important influence on the assembly and imaging quality of the eyepiece. Selecting the back focal length within this range can achieve good imaging effects while ensuring the assembly space. A smaller back focal length helps to shorten the overall length of the eyepiece, while a larger back focal length can provide more assembly space.

According to the ranges of the focal power φ, the total track length L and the back focal length B of the eyepiece provided in the above examples, three embodiments are given, and the details can be seen in table 1 below.

TABLE 1

|  | Back focal length B/mm | Total optical length L/mm | Optical power φ |
| --- | --- | --- | --- |
| First embodiment | 3.41 | 23 | 0.029 |
| Second embodiment | 2.58 | 25 | 0.023 |
| Third embodiment | 2.35 | 25 | 0.024 |

By accurately setting the range of the optical focal length φ, the total track length L and the back focal length B of the eyepiece, technical effects such as optimizing imaging quality, balancing compactness and performance, and adapting to different application scenarios can be achieved.

In some examples of the present application, as shown in FIG. 1, FIG. 8 and FIG. 14, the lens group includes a first lens 5, a second lens 4, a third lens 3 and a fourth lens 2 provided along the optical axis; the fourth lens 2 is provided at a side adjacent to the display screen 1, the first lens 5 is provided at a side distant from the display screen 1, and the second lens 4 and the third lens 3 are sequentially provided between the first lens 5 and the fourth lens 2. The notch 201 is provided on a non-optically effective area on the surface of the fourth lens 2 adjacent to the display screen 1, and the notch 201 is provided in a surrounding or local manner.

According to the eyepiece provided in the embodiment of the present application, the lens group may be composed of four lenses provided in sequence along the optical axis, as shown in FIG. 1, FIG. 8 and FIG. 14, which are respectively the first lens 5, the second lens 4, the third lens 3 and the fourth lens 2. The fourth lens 2 is provided at the side adjacent to the display screen 1, while the first lens 5 is provided at the side distant from the display screen 1 (that is, the side adjacent to the human eye 01), and the second lens 4 and the third lens 3 are provided in sequence between the two. This layout ensures that light can pass through these lenses in sequence to achieve focusing and imaging.

The fourth lens 2 is a lens adjacent to the display screen 1, and the notch 201 is provided on the non-optically effective area of the surface of the fourth lens 2 adjacent to the display screen 1. First, the notch 201 is provided to avoid the structural parts or supporting parts on the display screen 1. The notch 201 can be provided in a whole circle around the non-optically effective area of the fourth lens 2, or only partially provided, to meet different assembly requirements. This flexibility enables the eyepiece to be compatible with more types of display screens and their accessories, and improves the versatility and applicability of the product.

By reasonably designing the size and position of the notch 201, the impact on the optical performance of the fourth lens 2 can be minimized while ensuring the assembly space. The non-optically effective areas are the parts of the lens that do not participate in imaging, so providing notches in these areas will not significantly affect the imaging quality. At the same time, the design of the notch 201 also takes into account the mechanical strength and stability of the lens, ensuring that it can maintain stable and reliable performance during assembly and use.

The above example of the present application describes the composition of the lens group in the eyepiece and the design of the notch 201 on the fourth lens 2. This design not only takes into account the balance between assembly requirements and optical performance, but also optimizes the overall structure of the eyepiece, improving the versatility, applicability and competitiveness of the product.

It should be noted that, in the eyepiece provided in the embodiment of the present application, the lens group includes but is not limited to using four lenses. The lens group can use at least one lens. In other words, the eyepiece provided in the embodiment of the present application does not limit the quantity of lenses in the lens group, and at least one lens is sufficient.

In the example provided in the present application, the lens group includes lenses made of materials with a refractive index in the range of 1.4 to 2.0 and a dispersion coefficient in the range of 20 to 90.

The center thickness of the first lens 5 T1 ranges from 0.5 mm to 10 mm, and the first lens 5 includes a first surface 51 and a second surface 52, the first surface 51 is adjacent to the display screen 1, and the second surface 52 is distant from the display screen 1. The first surface 51 and the second surface 52 are aspherical surfaces or plane surfaces.

The central thickness of the second lens 4 T2 ranges from 1 mm to 8 mm, and the second lens 4 includes a third surface 41 and a fourth surface 42, the third surface 41 is adjacent to the display screen 1, and the fourth surface 42 is distant from the display screen 1. The third surface 41 and the fourth surface 42 are aspherical or spherical, and anti-reflection films can be attached to the surfaces.

The central thickness of the third lens 3 T3 ranges from 1 mm to 8 mm, and the third lens 3 includes a fifth surface 31 and a sixth surface 32, the fifth surface 31 is adjacent to the display screen 1, and the sixth surface 32 is distant from the display screen 1. The fifth surface 31 and the sixth surface 32 are aspherical or spherical surfaces, and anti-reflection films can be attached to the surfaces.

Figure 9:
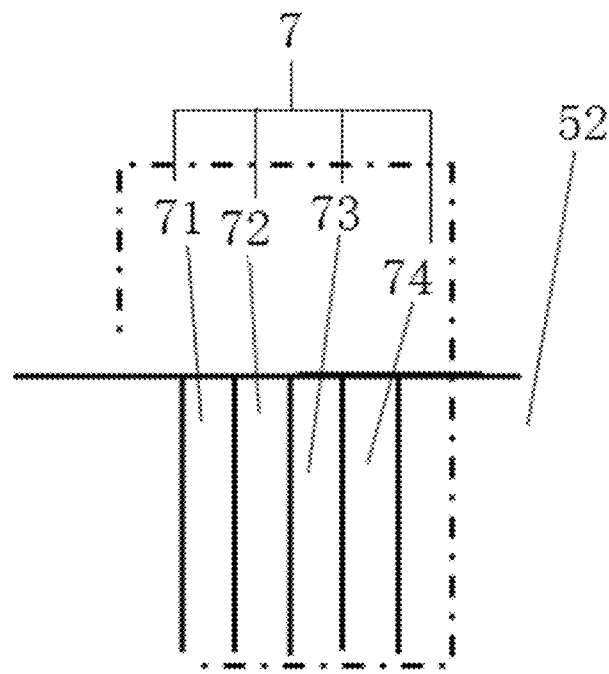
FIG. 9 is a schematic diagram of a film-attaching manner for a laminated element of the eyepiece shown in FIG. 8.

In some examples of the present application, as shown in FIG. 3 and FIG. 9, the eyepiece further includes a polarizing element 72, and the polarizing element 72 is provided at a side of the polarizing reflective element 73 distant from the phase retarder 74.

The polarizing element 72 is, for example, a linear polarizing film, and its transmission axis direction can be along the horizontal direction, the vertical direction or any other direction. The introduction of the polarizing element 72 can reduce stray light, improve the contrast and clarity of imaging, which is beneficial to improving the final imaging quality.

The polarizing element 72 is provided at a side of the polarizing reflective element 73 distant from the phase retarder 74. Through the coordinated action of various optical elements, precise control of light is achieved.

In some examples of the present application, the eyepiece also includes a composite film material 8, which is provided between the display screen 1 and the beam splitting element 6, and is used to convert the light emitted by the display screen 1 into circularly polarized light. The composite film material 8 includes at least a polarizing film and a phase retardation film.

In the optical structure of the eyepiece, the composite film material 8 can be provided between the display screen 1 and the beam splitting element 6, and its main function is to convert the light emitted by the display screen 1 into circularly polarized light. The composite film material 8 includes at least a polarizing film and a phase retardation film, and the combination of these two film materials can achieve precise control of the polarization state of light.

The polarizing film is a film material that can selectively absorb, transmit or reflect light vibrating in a certain direction. In the eyepiece, it can be used to filter out unnecessary light and improve the contrast and clarity of the image.

The phase retardation film can change the phase of light, so that the originally linearly polarized light becomes circularly polarized light. Circularly polarized light has unique advantages in many applications, such as reducing reflection and scattering and improving the efficiency of light utilization. The phase retardation film is, for example, a ¼ waveplate.

By converting the light emitted by the display screen 1 into circularly polarized light, the loss of light during transmission can be effectively reduced, and the utilization rate of light can be improved. Secondly, circularly polarized light can reduce reflection and scattering, making the image clearer and the color more saturated. In addition, the use of the composite film material 8 can also improve the stability and reliability of the optical system and reduce the interference of ambient light on the imaging quality.

In some examples of the present application, as shown in FIG. 3 and FIG. 9, the polarization element 72, the polarization reflection element 73, and the phase retarder 74 are sequentially stacked to form a laminated element 7.

The polarization element 72, the polarization reflection element 73 and the phase retarder 74 are stacked to form a laminated structure. This laminated structure not only simplifies the structure of the optical system, but also achieves precise control of light through the synergistic effect of each element.

In addition, the above-mentioned laminated structure may further include a first anti-reflection film 71. In an embodiment, the first anti-reflection film 71 may be glued and provided at a side of the polarizing element 72 distant from the polarizing reflective element 73.

In order to further improve the imaging quality, a first anti-reflection film 71 can be introduced into the optical design of the eyepiece. The first anti-reflection film 71 is glued and provided at the side of the polarizing element 72 distant from the polarizing reflection element 73. The main function of the anti-reflection film is to reduce the reflection loss of light on the surface of the element and improve the utilization rate of light. By introducing the first anti-reflection film 71, the light energy loss caused by reflection can be further reduced, thereby improving the light energy utilization rate and imaging quality of the entire eyepiece.

In some examples of the present application, as shown in FIG. 1 and FIG. 3, the laminated element 7 is provided at the surface of the first lens 5 adjacent to the display screen 1; the beam splitting element 6 is provided in the optically effective area on the surface of the fourth lens 2 adjacent to the display screen 1; and the composite film material 8 is provided at the light-emitting surface of the display screen 1.

As shown in FIG. 1 and FIG. 3, the laminated element 7 is provided at the surface of the first lens 5 adjacent to the display screen 1, and the beam splitting element 6 is provided at the optically effective area on the surface of the fourth lens 2 adjacent to the display screen 1. Note that the beam splitting element 6 (i.e., a semi-transparent and semi-reflective film) is plated or attached only on the optically effective area, and the composite film material 8 is provided at the light-emitting surface of the display screen 1.

Since the composite film material 8 is directly attached to the light-emitting surface of the display screen 1, it can more effectively convert the light emitted by the display screen 1 into circularly polarized light, reducing the loss of light during transmission. The beam splitting element 6 is located in the optically effective area of the fourth lens 2, which can ensure that the light is properly split when passing through the lens group. The arrangement of the laminated element 7 helps to optimize the optical performance of the first lens 5. Overall, this configuration can provide better optical performance.

In this example, as shown in FIG. 1, the refractive index $n1$ and the dispersion coefficient $v1$ of the first lens 5 are: [$n1=1.8$, $v1=41$], the refractive index $n2$ and the dispersion coefficient $v2$ of the second lens 4 are: [$n2=1.62$, $v2=58$], the refractive index $n3$ and the dispersion coefficient $v3$ of the third lens 3 are: [$n3=1.69$, $v3=31$], and the refractive index $n4$ and the dispersion coefficient $v4$ of the fourth lens 2 are: [$n4=1.49$, $v4=70$].

In some examples of the present application, as shown in FIG. 8 and FIG. 9, the laminated element 7 is provided at the surface of the first lens 5 distant from the display screen 1; the beam splitting element 6 is provided in the optically effective area on the surface of the fourth lens 2 adjacent to the display screen 1; and the composite film material 8 is provided at the light-emitting surface of the display screen 1.

As shown in FIG. 8 and FIG. 9: the laminated element 7 is provided at the surface of the first lens 5 distant from the display screen 1, the beam splitting element 6 is provided in the optically effective area on the surface of the fourth lens 2 adjacent to the display screen 1, and the composite film material 8 is provided at the light-emitting surface of the display screen 1.

Compared with the above example, the main difference of this configuration is the position of the laminated element 7. The laminated element 7 is provided at the side of the first lens 5 distant from the display screen 1, which may affect the distribution and intensity of the light before entering the lens group, which may have a certain impact on the overall optical performance. However, since the positions of the composite film material 8 and the beam splitting element 6 are unchanged, the impact is very small.

In this example, as shown in FIG. 8, the refractive index n1 and the dispersion coefficient v1 of the first lens 5 are: [n1=1.64, v1=60], the refractive index n2 and the dispersion coefficient v2 of the second lens 4 are: [n2=1.59, v2=61], the refractive index n3 and the dispersion coefficient v3 of the third lens 3 are: [n3=1.78, v3=26], and the refractive index n4 and the dispersion coefficient v4 of the fourth lens 2 are: [n4=1.59, v4=61].

In some examples of the present application, as shown in FIG. 14 and FIG. 3, the laminated element 7 is provided at a side of the first lens 5 adjacent to the display screen 1; the beam splitting element 6 is provided at a surface of the fourth lens 2 distant from the display screen 1; and the composite film material 8 is provided in an optically effective area on a surface of the fourth lens 2 adjacent to the display screen 1.

As shown in FIG. 14 and FIG. 3: the laminated element 7 is provided at the side of the first lens 5 adjacent to the display screen 1, the beam splitting element 6 is provided at the surface of the fourth lens 2 distant from the display screen 1, and the composite film material 8 is provided in the optically effective area on the surface of the fourth lens 2 adjacent to the display screen 1. Note that the composite film material 8 only needs to be attached to the optically effective area.

In this configuration, the positions of the composite film material 8 and the beam splitting element 6 are changed. The composite film material 8 is provided in the optically effective area of the fourth lens, which can ensure that the light is circularly polarized before passing through the lens group, but may increase the complexity of the lens design. The beam splitting element 6 is provided at the side of the fourth lens 2 distant from the display screen 1, which is convenient for coating or film-attaching. In addition, the position of the laminated element 7 is identical to that of the first example (as shown in FIG. 1).

In this example, as shown in FIG. 14, the refractive index n1 and the dispersion coefficient v1 of the first lens 5 are: [n1=1.59, v1=61], the refractive index n2 and the dispersion coefficient v2 of the second lens 4 are: [n2=1.52, v2=64], the refractive index n3 and the dispersion coefficient v3 of the third lens 3 are: [n3=1.67, v3=32], and the refractive index n4 and the dispersion coefficient v4 of the fourth lens 2 are: [n4=1.49, v4=70].

It should be noted that, from the perspective of optical performance, the first example shown in FIG. 1 and FIG. 3 may be the best choice, because it can most directly and effectively convert the light emitted by the display screen 1 into circularly polarized light, and perform appropriate spectroscopic processing through the beam splitting element 6.

According to the above three examples, in the optical structure design of the eyepiece, the positions of the laminated element 7, the beam splitting element 6 and the composite film material 8 are different. These different configurations will have a certain impact on the optical performance of the eyepiece, and can be selected according to needs in practical applications.

The eyepiece provided in the embodiment of the present application can ensure the overall assembly requirements while reducing the back focal length B, thereby achieving the purpose of reducing the product space size and improving the imaging quality.

According to the eyepiece provided in the embodiment of the present application, the light propagation path is as follows.

The light emitted by the display screen 1 is converted into circularly polarized light by the composite film material 8, transmitted through the fourth lens 2, the third lens 3 and the second lens 4, converted into linearly polarized light (S light) by the phase retarder 74 (¼ waveplate) on the surface (first surface 51 or second surface 52) of the first lens 5, reflected by the polarization reflection element 73 on the surface (first surface 51 or second surface 52) of the first lens 5, converted into circularly polarized light by the phase retarder 74 again, reflected by the surface (seventh surface 21 or eighth surface 22) of the fourth lens 2, and then converted into linearly polarized light (P light) by the phase retarder 74 for the third time to be transmitted and enter the human eye 01 to form an image.

The optical system and optical performance provided by the embodiments of the present application are described below through first embodiment to third embodiment.

First Embodiment

As shown in FIG. 1 to FIG. 3, the eyepiece includes a first lens 5, a laminated element 7, a second lens 4, a third lens 3, a fourth lens 2, a beam splitting element 6, a composite film 8 and a display screen 1 provided along the same optical axis; the laminated element 7 is provided at the first surface 51 of the first lens 5, the beam splitting element 6 is provided at the optically effective area of the eighth surface 22 of the fourth lens 2, and the composite film 8 is provided at the light-emitting surface of the display screen 1.

The non-optically effective area of the eighth surface 22 of the fourth lens 2 is at least partially provided with the notch 201.

The laminated element 7 includes a first anti-reflection film 71, a polarizing element 72, a polarizing reflective element 73 and a phase retarder 74 which are stacked.

The composite film material 8 includes a polarizing film and a phase retardation film, and also includes a second anti-reflection film;

The focal power φ of the eyepiece is 0.029, the total track length L is 23 mm, and the back focal length B is 3.41 mm.

The eyepiece satisfies: $\varphi/(L-B) \approx 0.00148$ (unit: $1/mm^2$).

Table 2 shows the specific optical parameters of the optical system of the first embodiment.

TABLE 2

| surface | Radius (mm) | Thickness (mm) | Material | Conic | A2 | A4 | A6 | A8 | A10 | A12 |
|---|---|---|---|---|---|---|---|---|---|---|
| 52 | Infinity | 1.0000 | H-ZLAF52A | 0 | 0 | 0.00E+00 | 0.00E+00 | 0.00E+00 | 0.00E+00 | 0.00E+00 |
| 51 | Infinity | 0.5000 | | 0.00E+00 | 0 | 0.00E+00 | 0.00E+00 | 0.00E+00 | 0.00E+00 | 0.00E+00 |

TABLE 2-continued

| surface | Radius (mm) | Thickness (mm) | Material | Conic | A2 | A4 | A6 | A8 | A10 | A12 |
|---|---|---|---|---|---|---|---|---|---|---|
| 42 | 35.2735 | 6.6923 | H-ZK21 | 0.0000 | 0.0000 | 0.000E+00 | 0.000E+00 | 0.000E+00 | 0.000E+00 | 0.000E+00 |
| 41 | −164.4580 | 3.4904 | | 0.0000 | 0.0000 | 0.000E+00 | 0.000E+00 | 0.000E+00 | 0.000E+00 | 0.000E+00 |
| 32 | −179.6342 | 1.6000 | H-ZF10 | 0.0000 | 0.0000 | 0.000E+00 | 0.000E+00 | 0.000E+00 | 0.000E+00 | 0.000E+00 |
| 31 | 78.3312 | 5.0662 | | 0.0000 | 0.0000 | 0.000E+00 | 0.000E+00 | 0.000E+00 | 0.000E+00 | 0.000E+00 |
| 22 | −168.2830 | 1.6000 | H-QK3L | 2.3288 | 0.0000 | 0.000E+00 | 3.116E−07 | −2.284E−10 | −4.455E−12 | 9.619E−15 |
| 21 | −209.8310 | 1.7042 | | 0.0000 | 0.0000 | −1.353E−05 | 8.718E−08 | 9.737E−11 | −2.530E−12 | 6.941E−15 |

The optical performance of the near-eye optical system provided in the first embodiment is demonstrated below through a dot array diagram, a modulation transfer function (MTF) curve diagram, field curvature and distortion, and vertical axis chromatic aberration.

A point diagram refers to a diffuse pattern formed in a certain range when many light rays emitted from one point pass through the optical system and their intersection with the image plane is no longer concentrated at the same point due to aberration. It is mainly used to evaluate the imaging quality of the projection optical system.

The MTF curve is a modulation transfer function graph that characterizes the imaging clarity of an optical system through the contrast of black and white line pairs.

Vertical axis chromatic aberration is also called magnification chromatic aberration, which mainly refers to a complex main light ray on the object side, which becomes multiple light rays when it emerges on the image side due to the dispersion of the refraction system, and the difference in the focal position of blue light and red light on the image plane.

Figure 4:
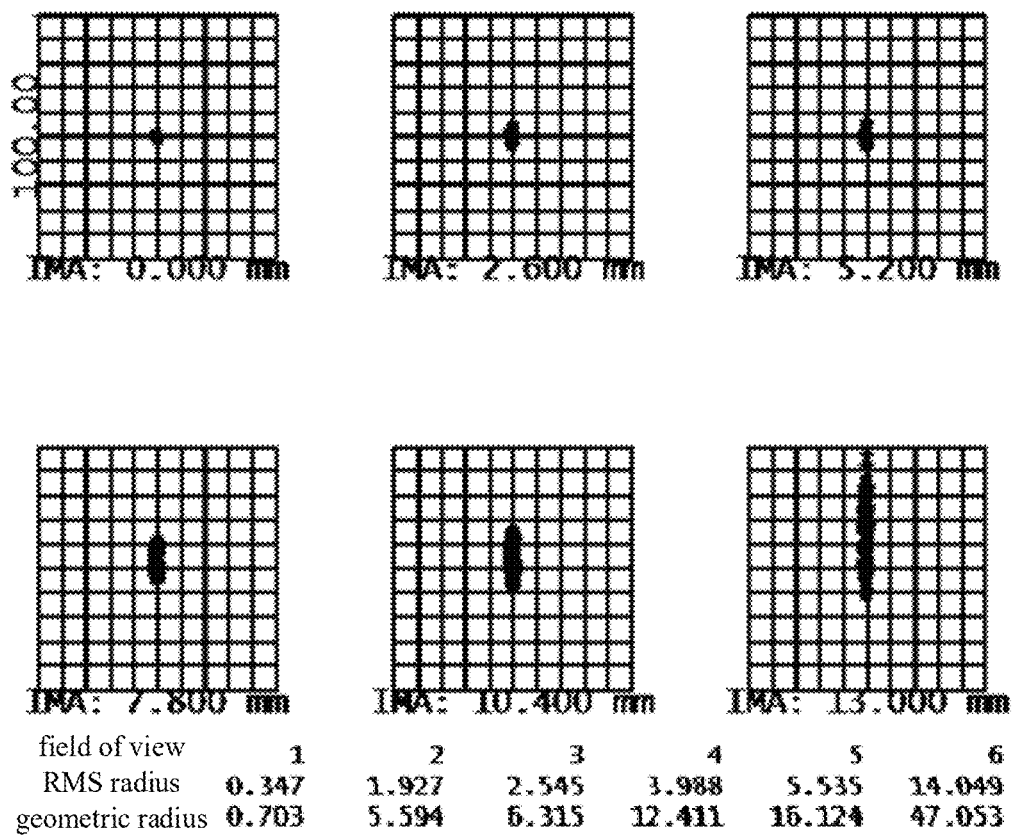
FIG. 4 is a schematic diagram of the eyepiece shown in FIG. 1.

As shown in FIG. 4, for the eyepiece shown in FIG. 1, the maximum value of the image point in the spot diagram is less than 15 μm.

Figure 5:
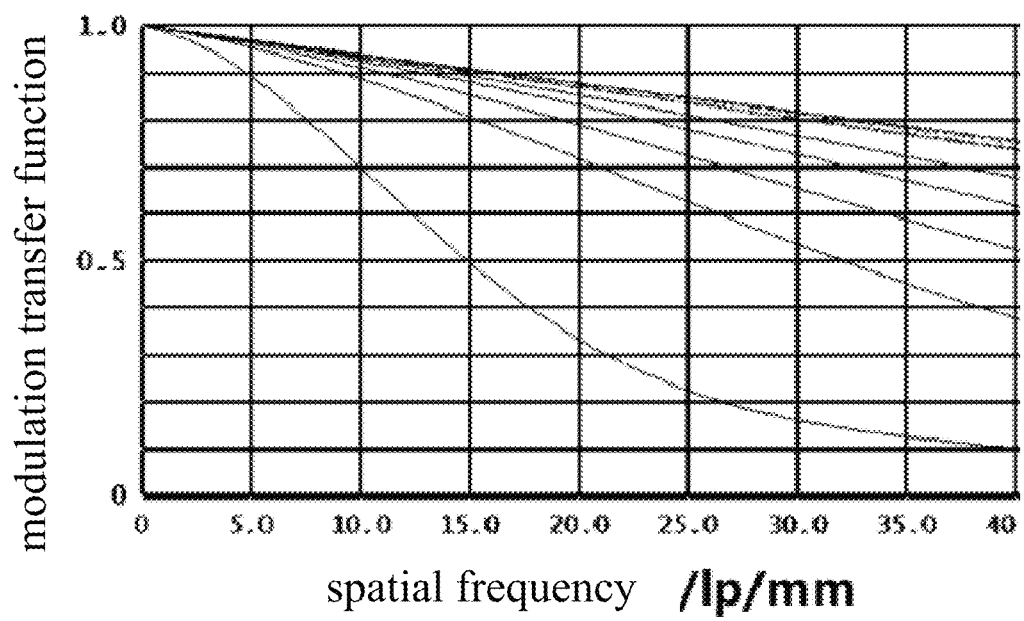
FIG. 5 is a graph showing a modulation transfer function (MTF) of the eyepiece shown in FIG. 1.

As shown in FIG. 5, for the eyepiece shown in FIG. 1, the MTF is greater than 0.1 at 40 l p/mm.

Figure 6:
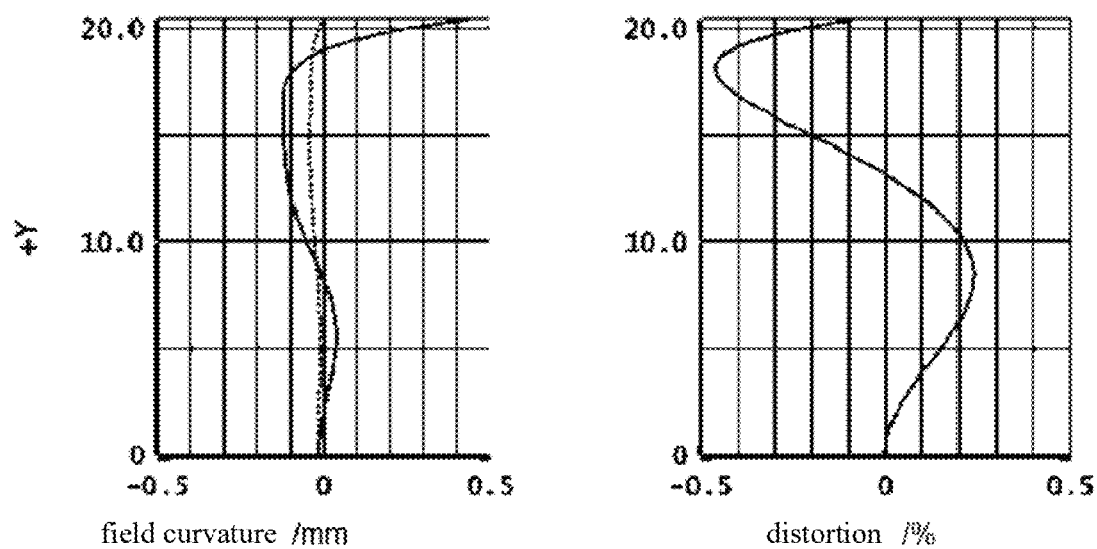
FIG. 6 is a diagram showing distortion and chromatic aberration of the eyepiece shown in FIG. 1.

As shown in FIG. 6, for the eyepiece shown in FIG. 1, the maximum distortion occurs in 1 field of view, and the absolute value is less than 5%.

Figure 7:
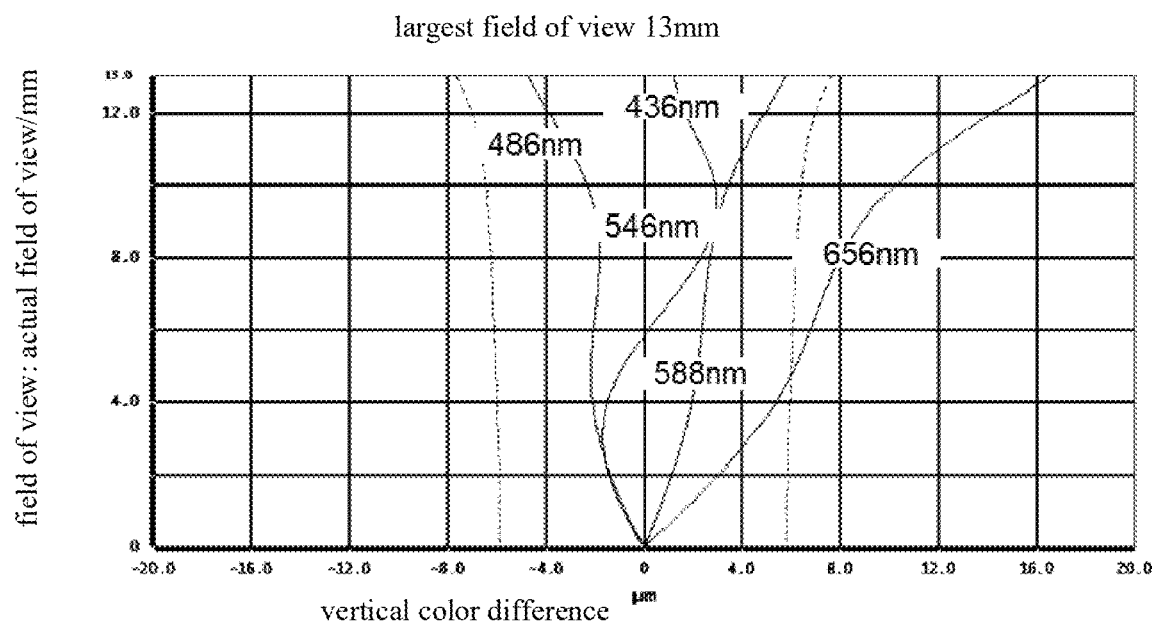
FIG. 7 is a diagram of vertical axis chromatic aberration of the eyepiece shown in FIG. 1.

As shown in FIG. 7, for the eyepiece shown in FIG. 1, the maximum chromatic aberration value is less than 40 μm.

Second Embodiment

The eyepiece shown in this second embodiment, as shown in FIG. 8 and FIG. 9, is different from the optical system shown in the above first embodiment in that the specific optical parameters of the optical system are different, as shown in Table 3 below, and the film sticking method is different.

The film pasting method is as follows: the laminated element 7 is provided at the surface of the first lens 5 distant from the display screen 1; the beam splitting element 6 is provided in the optically effective area on the surface of the fourth lens 2 adjacent to the display screen 1; and the composite film material 8 is provided at the light-emitting surface of the display screen 1.

The focal power φ of the eyepiece is 0.023, the total track length L is 25 mm, and the back focal length B is 2.58 mm.

The eyepiece satisfies: φ/(L−B)≈0.0010259 (unit: 1/mm²).

Table 3 shows the specific optical parameters of the optical system of the second embodiment.

TABLE 3

| surface | Radius (mm) | Thickness (mm) | Material | Conic | A2 | A4 | A6 | A8 | A10 | A12 |
|---|---|---|---|---|---|---|---|---|---|---|
| 52 | Infinity | 2.8125 | H-LAK4L | 0.00E+00 | 0 | 0.00E+00 | 0.00E+00 | 0.00E+00 | 0.00E+00 | 0.00E+00 |
| 51 | −86.1200 | 0.3000 | | 0.00E+00 | 0.00E+00 | 5.17E−07 | 1.92E−08 | −3.29E−11 | 2.86E−14 | 0.00E+00 |
| 42 | 25.4136 | 3.0075 | H-ZK3 | −0.3073 | 0.0000 | −2.374E−06 | −4.198E−09 | −2.286E−11 | 0.000E+00 | 0.000E+00 |
| 41 | 34.3830 | 1.1008 | | −0.3826 | 0.0000 | −7.511E−07 | −2.381E−09 | 6.637E−12 | 0.000E+00 | 0.000E+00 |
| 32 | 27.2128 | 2.0000 | ZF51 | −0.0276 | 0.0000 | −1.411E−06 | 6.348E−09 | 2.117E−11 | 0.000E+00 | 0.000E+00 |
| 31 | 20.7332 | 11.1552 | | 0.0600 | 0.0000 | −9.790E−07 | −9.662E−09 | −4.710E−12 | 0.000E+00 | 0.000E+00 |
| 22 | −139.7517 | 2.7651 | H-ZK3 | 11.6117 | 0.0000 | 2.480E−05 | 1.847E−08 | −4.107E−10 | 9.505E−13 | −5.445E−17 |
| 21 | −182.4778 | 0.5000 | | 7.9618 | 0.0000 | 6.535E−06 | 3.811E−09 | −1.512E−10 | 3.659E−13 | −1.412E−16 |

Figure 10:
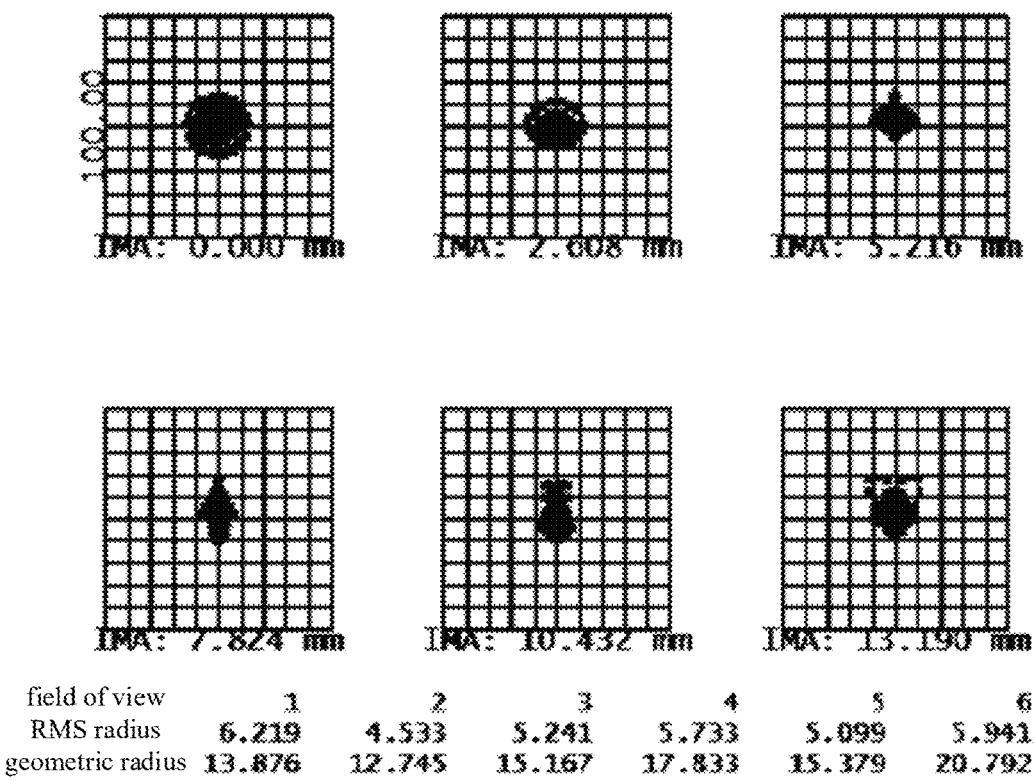
FIG. 10 is a schematic diagram of the eyepiece shown in FIG. 8.

As shown in FIG. 10, for the eyepiece shown in FIG. 8, the maximum value of the image point in the spot diagram is less than 7 μm.

Figure 11:
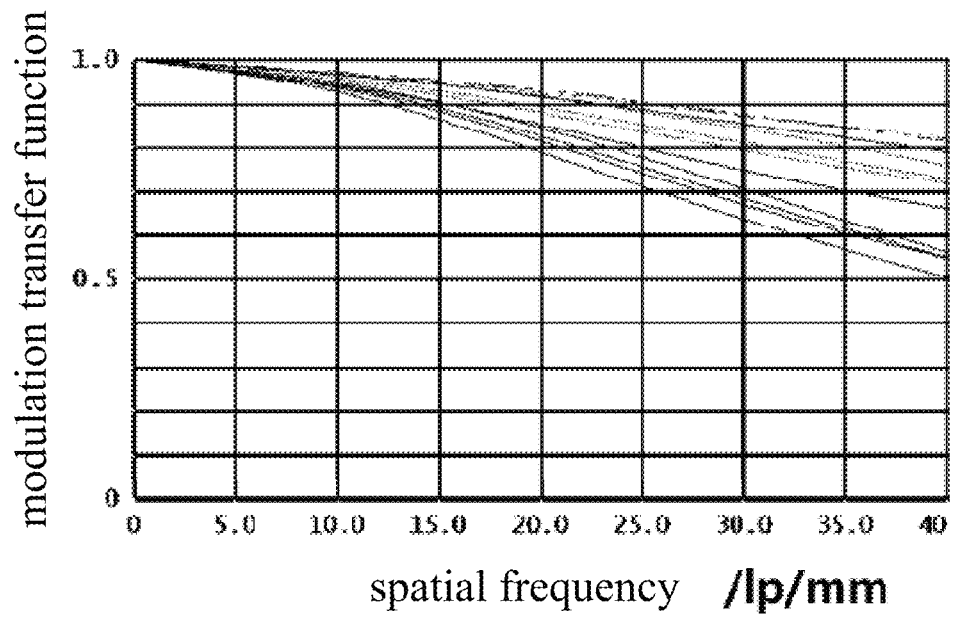
FIG. 11 is a graph showing an MTF of the eyepiece shown in FIG. 8.

As shown in FIG. 11, for the eyepiece shown in FIG. 8, the MTF is greater than 0.1 at 40 l p/mm.

Figure 12:
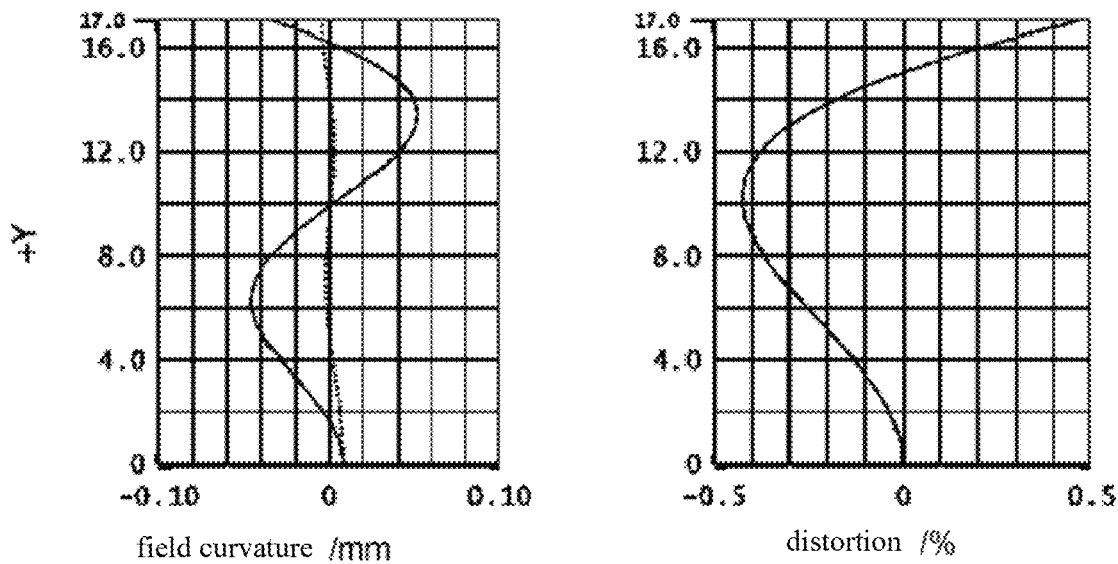
FIG. 12 is a diagram showing distortion and chromatic aberration of the eyepiece shown in FIG. 8.

As shown in FIG. 12, for the eyepiece shown in FIG. 8, the maximum distortion occurs in 1 field of view, and the absolute value is less than 5%.

Figure 13:
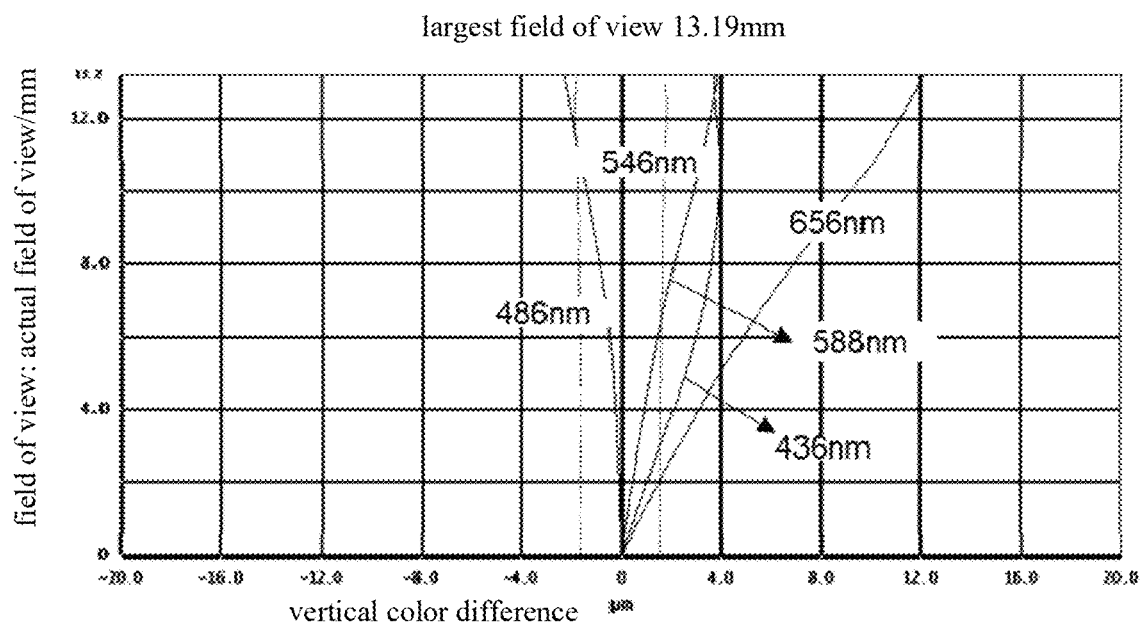
FIG. 13 is a diagram of vertical axis chromatic aberration of the eyepiece shown in FIG. 8.

As shown in FIG. 13, for the eyepiece shown in FIG. 8, the maximum chromatic aberration value is less than 40 μm.

Third Embodiment

The eyepiece shown in the third embodiment, as shown in FIG. 14 and FIG. 3, is different from the optical system shown in the above first embodiment in that the specific optical parameters of the optical system are different, as shown in table 4 below, and the film sticking method is different.

The film pasting method is as follows: the laminated element 7 is provided at the side of the first lens 5 adjacent to the display screen 1; the beam splitting element 6 is provided at the surface of the fourth lens 2 distant from the display screen 1; the composite film material 8 is provided at the optically effective area on the surface of the fourth lens 2 adjacent to the display screen 1;

The focal power φ of the eyepiece is 0.024, the total track length L is 25 mm, and the back focal length B is 2.38 mm.

The eyepiece satisfies: $q/(L-B) \approx 0.001061$ (unit: $1/mm^2$).

Table 4 shows the specific optical parameters of the optical system of the third embodiment.

bring immersive visual experience to users, but can also be applied to many other scenarios, such as high-precision visual devices such as sights.

When applied in VR head mounted display devices, the optical system provided in the embodiments of the present application can optimize the visual imaging quality and enhance the user experience. When applied in applications such as sights, its precise optical design and optimized spatial layout can ensure the accuracy and stability of target positioning.

With the continuous advancement of technology, the market demand for head-mounted display devices and sights is growing, and the performance requirements for optical systems are getting higher and higher. The optical system of this application not only meets the market demand for high-quality imaging through precise optical design and spatial layout optimization, but also achieves a reduction in system size, adapting to the trend of miniaturization and lightweight equipment.

In addition, the optical system of the embodiment of the present application also has good compatibility and scalability, and can be customized and optimized according to the needs of different devices and application scenarios. Whether it is a head-mounted display device or a sight, the optical system provided by the embodiment of the present application can provide stable and reliable visual support, bringing better visual experience and function realization to various application scenarios.

In general, for the optical system provided in the embodiments of the present application, its optical performance and

TABLE 4

| surface | Radius (mm) | Thickness (mm) | Material | Conic | A2 | A4 | A6 | A8 | A10 | A12 |
|---|---|---|---|---|---|---|---|---|---|---|
| 52 | 113.9253 | 2.0427 | D-ZK3 | −10 | 0.00E+00 | 5.40E−06 | −1.06E−10 | 5.20E−11 | −2.30E−13 | 4.55E−16 |
| 51 | Infinity | 0.4000 | | 0.00E+00 | 0 | 0.000E+00 | 0.000E+00 | 0.000E+00 | 0.000E+00 | 0.000E+00 |
| 42 | 31.5949 | 3.7628 | H-K9L | −0.3073 | 0.0000 | 0.000E+00 | 0.000E+00 | 0.000E+00 | 0.000E+00 | 0.000E+00 |
| 41 | 158.2802 | 6.0332 | | −0.3826 | 0.0000 | 0.000E+00 | 0.000E+00 | 0.000E+00 | 0.000E+00 | 0.000E+00 |
| 32 | −37.5879 | 4.7597 | H-ZF2 | −0.0276 | 0.0000 | 0.000E+00 | 0.000E+00 | 0.000E+00 | 0.000E+00 | 0.000E+00 |
| 31 | −77.7466 | 5.1327 | | 0.0600 | 0.0000 | 0.000E+00 | 0.000E+00 | 0.000E+00 | 0.000E+00 | 0.000E+00 |
| 22 | −182.1596 | 1.2000 | H-ZF2 | 11.6117 | 0.0000 | 2.522E−06 | 6.996E−10 | −1.204E−12 | 0.000E+00 | 0.000E+00 |
| 21 | −77.7466 | 0.4000 | | 7.9618 | 0.0000 | 0.000E+00 | 0.000E+00 | 0.000E+00 | 0.000E+00 | 0.000E+00 |

Figure 15:
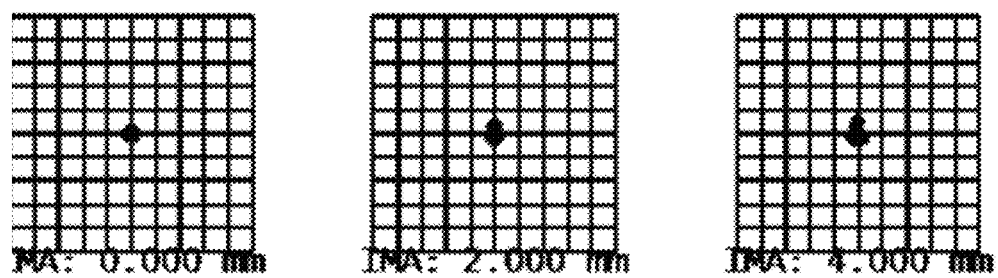
FIG. 15 is a schematic diagram of the eyepiece shown in FIG. 14.

As shown in FIG. 15, for the eyepiece shown in FIG. 14, the maximum value of the image point in the spot diagram is less than 14 μm.

Figure 16:
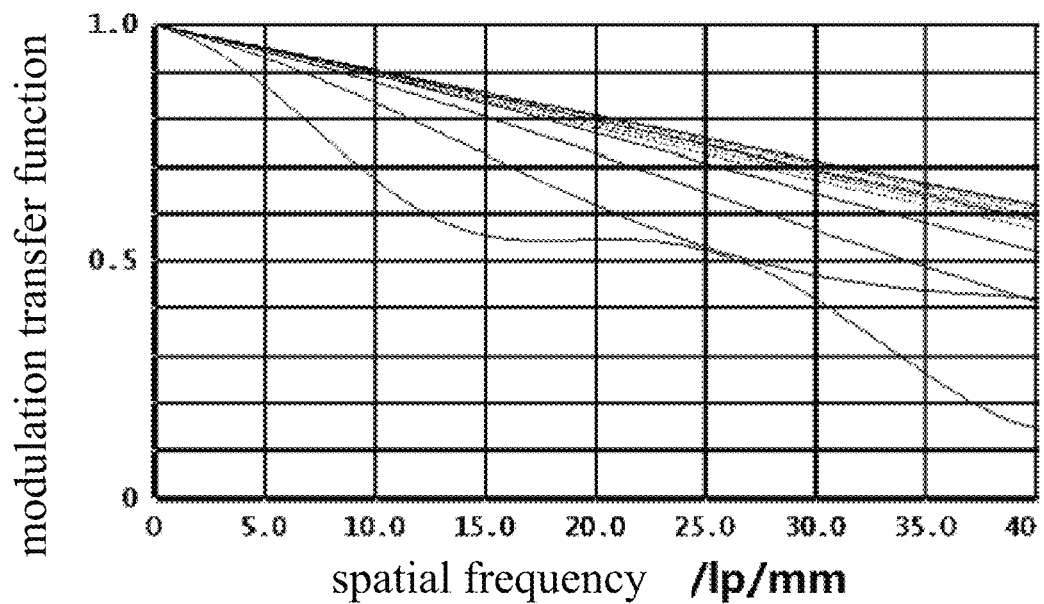
FIG. 16 is a graph showing an MTF of the eyepiece shown in FIG. 14.

As shown in FIG. 16, for the eyepiece shown in FIG. 14, the MTF is greater than 0.1 at 40 l p/mm.

Figure 17:
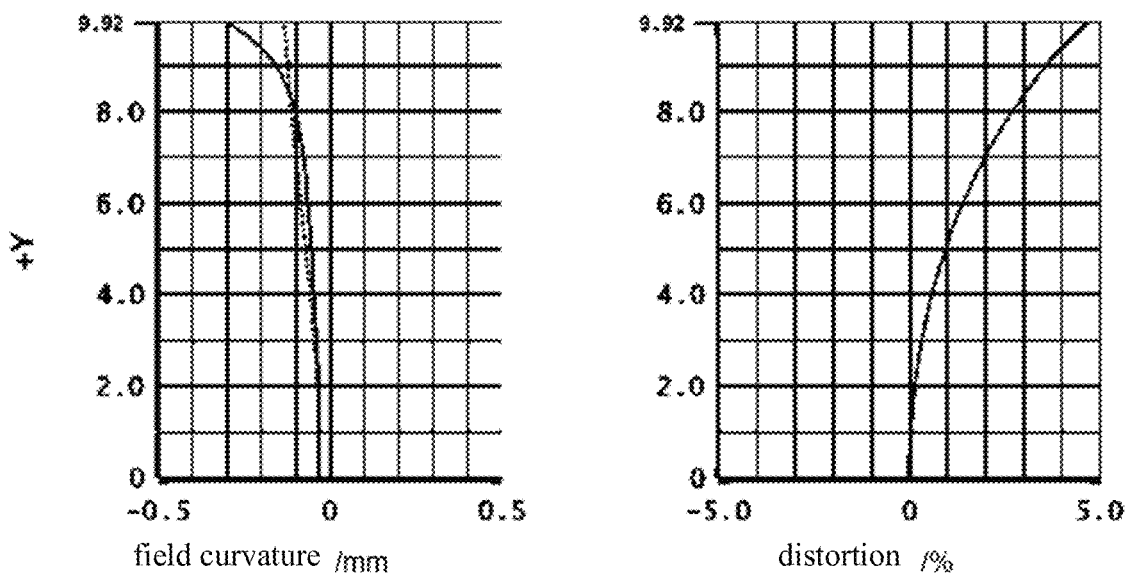
FIG. 17 is a diagram showing distortion and chromatic aberration of the eyepiece shown in FIG. 14.

As shown in FIG. 17, for the eyepiece shown in FIG. 14, the maximum distortion occurs in 1 field of view, and the absolute value is less than 5%.

Figure 18:
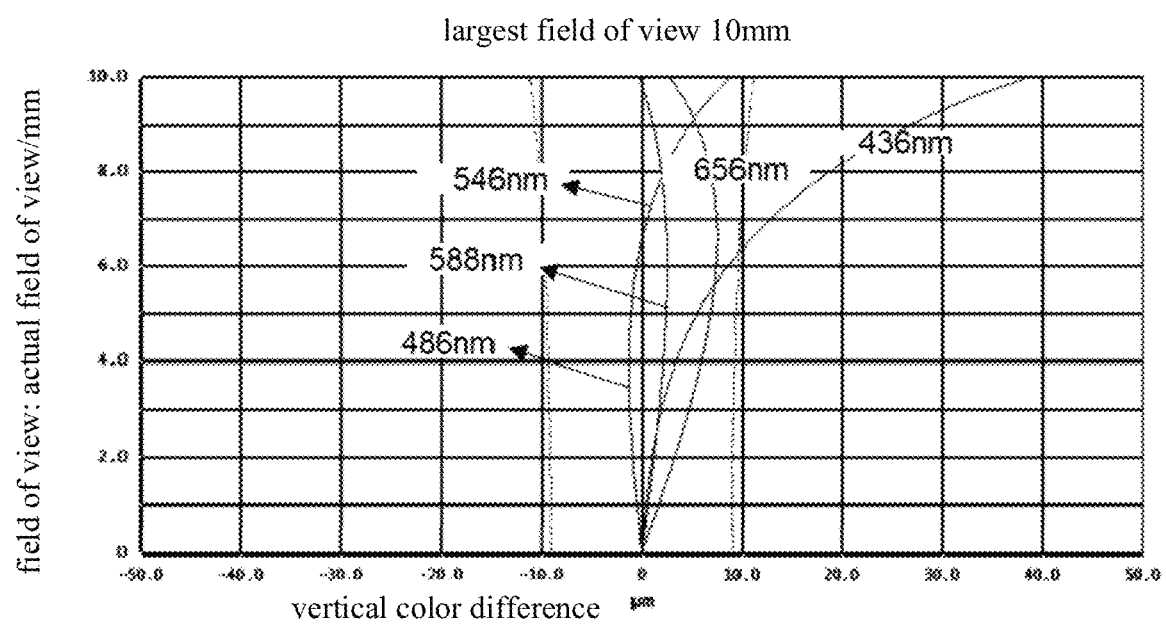
FIG. 18 is a diagram showing vertical axis chromatic aberration of the eyepiece shown in FIG. 14.

As shown in FIG. 18, for the eyepiece shown in FIG. 14, the maximum chromatic aberration value is less than 40 μm.

According to another aspect of the present application, an optical system is further provided, including the eyepiece as described above.

The optical system provided in the embodiment of the present application can not only be applied to head-mounted display devices such as VR head-mounted display devices to spatial layout optimization can meet the needs of different devices and application scenarios, and bring users better visual experience and functional realization.

The above embodiments focus on the differences between the various embodiments. As long as the different optimization features between the various embodiments are not contradictory, they can be combined to form another embodiment. Considering the simplicity of the text, they will not be repeated here.

Although some specific embodiments of the present application have been described in detail by way of example, it should be understood by those skilled in the art that the above examples are only for illustration, not for limiting the scope of the present application. It should be understood by those skilled in the art that the above embodiments may be modified without departing from the scope and spirit of the

What is claimed is:

1. An eyepiece, comprising:
a beam splitting element, a phase retarder, a polarized reflective element, and a lens group provided along a same optical axis,
wherein the lens group is provided between an optical path formed by the beam splitting element, the phase retarder, and the polarized reflective element,
the phase retarder is provided between the beam splitting element and the polarized reflective element; and
an optical power of the eyepiece is $\varphi$, a back focal length of the eyepiece is B, a total track length of the eyepiece is L, and $0.001 \leq \varphi/(L-B) \leq 0.003$.

2. The eyepiece of claim 1, further comprising a display screen,
wherein the display screen is provided at a side of the beam splitting element distant from the phase retarder; and
the lens group comprises at least one lens, and a notch is at least partially provided at a non-optically effective area of a lens adjacent to the display screen.

3. The eyepiece of claim 2, wherein a length v of the notch along a first direction is greater than 0; and/or,
a length h of the notch along a second direction is greater than or equal to 0.1 mm; and
the first direction is parallel to the optical axis, and the second direction is perpendicular to the first direction.

4. The eyepiece of claim 3, wherein the back focal length B of the eyepiece and the length v of the notch along the first direction satisfy: B−v>0.05 mm;
wherein a radial dimension of a non-optically effective area of a lens adjacent to the display screen is A, and the A and the length h of the notch along the second direction satisfy: $0.025 \leq h/A \leq 1$.

5. The eyepiece of claim 2, wherein the lens group comprises a first lens, a second lens, a third lens, and a fourth lens provided along the optical axis;
the fourth lens is provided at a side adjacent to the display screen, the first lens is provided at a side distant from the display screen, and the second lens and the third lens are sequentially provided between the first lens and the fourth lens; and
the notch is provided in a non-optically effective area on a surface of the fourth lens adjacent to the display screen, and wherein the notch is provided in a surrounding manner or in a local area.

6. The eyepiece of claim 5, further comprising a polarizing element provided at a side of the polarized reflective element distant from the phase retarder.

7. The eyepiece of claim 6, further comprising a composite film material provided between the display screen and the beam splitting element and configured to convert light emitted by the display screen into circularly polarized light,
wherein the composite film material comprises at least a polarizing film and a phase retardation film.

8. The eyepiece of claim 7, wherein the polarizing element, the polarized reflective element, and the phase retarder are stacked in sequence to form a laminated element.

9. The eyepiece of claim 8, wherein the laminated element is provided at a surface of the first lens distant from the display screen;
the beam splitting element is provided in an optically effective area on a surface of the fourth lens adjacent to the display screen; and
the composite film material is provided at a light-emitting surface of the display screen.

10. The eyepiece of claim 1, wherein the optical power $\varphi$ of the eyepiece satisfies: $0.02 < \varphi < 0.08$;
the total track length L of the eyepiece satisfies: 10 mm<L<27 mm; and
the back focal length B of the eyepiece satisfies: 1 mm<B<4 mm.

11. An optical system, comprising:
the eyepiece of claim 1.

12. An eyepiece, comprising:
a beam splitting element, a phase retarder, a polarized reflective element, a first lens, and a lens group provided along a same optical axis,
wherein the lens group is provided between an optical path formed by the beam splitting element, the phase retarder, and the polarized reflective element,
the phase retarder is provided between the beam splitting element and the polarized reflective element, and the first lens is provided at a side of the polarized reflective element distant from the phase retarder; and
an optical power of the eyepiece is q, a back focal length of the eyepiece is B, a total track length of the eyepiece is L, and $0.001 \leq \varphi/(L-B) \leq 0.003$.

13. The eyepiece of claim 12, further comprising a display screen,
wherein the display screen is provided at a side of the beam splitting element distant from the phase retarder; and
the lens group comprises at least one lens, and a notch is at least partially provided at a non-optically effective area of a lens adjacent to the display screen.

14. The eyepiece of claim 13, wherein the lens group comprises a second lens, a third lens, and a fourth lens provided along the optical axis;
the fourth lens is provided at a side adjacent to the display screen, the first lens is provided at a side distant from the display screen, and the second lens and the third lens are sequentially provided between the first lens and the fourth lens; and
the notch is provided in a non-optically effective area on a surface of the fourth lens adjacent to the display screen, and wherein the notch is provided in a surrounding manner or in a local area.

15. The eyepiece of claim 14, further comprising a composite film material provided between the display screen and the beam splitting element and configured to convert light emitted by the display screen into circularly polarized light;
wherein the composite film material comprises at least a polarizing film and a phase retardation film.

16. The eyepiece of claim 15, further comprising a polarizing element, wherein the polarizing element, the polarized reflective element, and the phase retarder are sequentially stacked to form a laminated element.

17. The eyepiece of claim 16, wherein the laminated element is provided at a surface of the first lens adjacent to the display screen;
the beam splitting element is provided in an optically effective area on a surface of the fourth lens adjacent to the display screen; and
the composite film material is provided at a light-emitting surface of the display screen.

18. The eyepiece of claim 16, wherein the laminated element is provided at a side of the first lens adjacent to the display screen;

the beam splitting element is provided at a surface of the fourth lens distant from the display screen; and the composite film material is provided in an optically effective area on a surface of the fourth lens adjacent to the display screen.

19. An optical system, comprising:

the eyepiece of claim 12.

* * * * *